US007433507B2

(12) United States Patent
Jabri et al.

(10) Patent No.: US 7,433,507 B2
(45) Date of Patent: Oct. 7, 2008

(54) IMAGING CHAIN FOR DIGITAL TOMOSYNTHESIS ON A FLAT PANEL DETECTOR

(75) Inventors: Kadri N. Jabri, Waukesha, WI (US); Gopal B. Avinash, New Berlin, WI (US); Stephen W. Metz, Greenfield, WI (US); John M. Sabol, Sussex, WI (US); Jeffrey W. Eberhard, Albany, NY (US); Bernard E. H. Claus, Niskayuna, NY (US); John P. Kaufhold, Schenectady, NY (US)

(73) Assignee: GE Medical Systems Global Technology Co., Waukesha, WI (US)

( * ) Notice: Subject to any disclaimer, the term of this patent is extended or adjusted under 35 U.S.C. 154(b) by 926 days.

(21) Appl. No.: 10/613,591

(22) Filed: Jul. 3, 2003

(65) Prior Publication Data
US 2005/0002550 A1 Jan. 6, 2005

(51) Int. Cl.
*G06K 9/00* (2006.01)
*G06K 9/32* (2006.01)
*G06K 9/03* (2006.01)

(52) U.S. Cl. ............ 382/132; 382/128; 382/131; 382/154; 382/294; 382/311

(58) Field of Classification Search ......... 382/128–134, 382/284, 293–300, 309–310, 154, 311
See application file for complete search history.

(56) References Cited

U.S. PATENT DOCUMENTS

| | | | |
|---|---|---|---|
| 4,188,640 A | 2/1980 | Dittrich et al. | |
| 4,207,595 A | 6/1980 | Dittrich et al. | |
| 4,246,483 A | 1/1981 | Weiss et al. | |
| 4,469,440 A | 9/1984 | Dallas | |
| 4,481,650 A | 11/1984 | Kinanen | |
| 4,516,252 A | 5/1985 | Linde et al. | |
| 4,566,112 A | 1/1986 | Linde et al. | |
| 4,598,369 A | 7/1986 | Wang et al. | |
| 4,662,379 A | 5/1987 | Macovski | |
| 4,736,396 A | 4/1988 | Boyd et al. | |
| 4,888,794 A | 12/1989 | Haaker et al. | |
| 4,903,204 A | 2/1990 | Dobbins, III | |
| 5,214,686 A | 5/1993 | Webber | |
| 5,359,637 A | 10/1994 | Webber | |
| 5,583,904 A | 12/1996 | Adams | |
| 5,598,454 A | 1/1997 | Franetzki et al. | |
| 5,644,612 A | 7/1997 | Moorman et al. | |
| 5,651,047 A | 7/1997 | Moorman et al. | |
| 5,719,952 A | 2/1998 | Rooks | |
| 5,729,584 A | 3/1998 | Moorman et al. | |

(Continued)

*Primary Examiner*—Matthew C. Bella
*Assistant Examiner*—Wesley Tucker
(74) *Attorney, Agent, or Firm*—Fletcher Yoder

(57) ABSTRACT

A method of creating and displaying images resulting from digital tomosynthesis performed on a subject using a flat panel detector is disclosed. The method includes the step of acquiring a series of x-ray images of the subject, where each x-ray image is acquired at different angles relative to the subject. The method also includes the steps of applying a first set of corrective measures to the series of images, reconstructing the series of images into a series of slices through the subject, and applying a second set of corrective measures to the slices. The method further includes the step of displaying the images or slices according to at least one of a plurality of display options.

22 Claims, 7 Drawing Sheets

U.S. PATENT DOCUMENTS

| | | |
|---|---|---|
| 5,751,785 A | 5/1998 | Moorman et al. |
| 5,828,722 A | 10/1998 | Ploetz et al. |
| 5,835,561 A | 11/1998 | Moorman et al. |
| 5,859,893 A | 1/1999 | Moorman et al. |
| 5,872,828 A | 2/1999 | Niklason et al. |
| 5,878,104 A | 3/1999 | Ploetz |
| 5,896,437 A | 4/1999 | Ploetz |
| 6,005,907 A | 12/1999 | Ploetz |
| 6,028,910 A | 2/2000 | Kirchner et al. |
| 6,081,577 A | 6/2000 | Webber |
| 6,178,220 B1 * | 1/2001 | Freundlich et al. ............. 378/4 |
| 6,196,715 B1 | 3/2001 | Nambu et al. |
| 6,198,802 B1 | 3/2001 | Elliott et al. |
| 6,216,540 B1 | 4/2001 | Nelson et al. |
| 6,234,671 B1 | 5/2001 | Solomon et al. |
| 6,256,370 B1 | 7/2001 | Yavuz |
| 6,289,235 B1 | 9/2001 | Webber et al. |
| 6,292,530 B1 | 9/2001 | Yavus et al. |
| 6,341,156 B1 | 1/2002 | Baetz et al. |
| 6,375,352 B1 | 4/2002 | Hewes et al. |
| 6,442,288 B1 | 8/2002 | Haerer et al. |
| 6,535,570 B2 * | 3/2003 | Stergiopoulos et al. ........ 378/8 |
| 6,862,364 B1 * | 3/2005 | Berestov ..................... 382/132 |
| 6,990,229 B2 * | 1/2006 | Ohishi ........................ 382/154 |
| 7,155,045 B2 * | 12/2006 | Rick et al. .................. 382/130 |

* cited by examiner

IMAGING CHAIN FOR DIGITAL TOMOSYNTHESIS ON A FLAT PANEL DETECTOR

BACKGROUND OF THE INVENTION

The present invention relates generally to the field of digital tomosynthesis. More specifically, the present invention relates to an imaging chain for digital tomosynthesis on a flat panel detector.

Digital tomosynthesis imaging is a technique that requires the acquisition of multiple x-ray images at different angles relative to the patient within a short time interval. Once these images have been acquired, a reconstruction algorithm is applied to the data represented by the images to reconstruct "slices" through the patient. These slices, which are essentially re-constructed x-ray images of selected planes within an object or patient, may eliminate any structures underlying or overlying a particular area or region of interest and thereby allow for improved diagnosis and treatment.

The standard digital radiography (DR) image acquisition, processing, and display chain was not designed with tomosynthesis in mind. As a result, the use of standard digital radiography processes and procedures presents a number of potential problems when used in the performance of digital tomosynthesis. For example, patient motion in-between the successive acquisitions may result in images that include motion artifacts. Similarly, physiologic motion (e.g., motion of the heart, lungs, etc.) in-between the successive acquisitions may also result in images that include motion artifacts. Other potential problems, such as intensity and resolution non-uniformities, may arise as a result of the angulation of the source of the x-rays relative to the detector. Yet another potential problem is that the use of large angulation ranges may result in increased scatter when no grid is used. Furthermore, errors and uncertainty in the positioning of the source and the detector may result in image reconstruction artifacts. Still another potential problem is that the reduced exposure used in tomosynthesis (relative to the standard single acquisition) may result in increased noise being present in the resulting images.

While various efforts have been made to address some of these potential problems, these efforts have generally been narrowly focused in one particular problem area. Moreover, these efforts have generally failed to address several potential opportunities that may be possible due to the additional information and data provided by digital tomosynthesis. One such opportunity involves the non-disruptive incorporation of three-dimensional imaging techniques into a traditional two-dimensional imaging system and workflow. Another such opportunity relates to the application of computer aided detection (CAD) algorithms to the additional image information that is generated by tomosynthesis. Still another opportunity is presented to create and utilize new visualization techniques that will enhance the diagnostic value of the additional information generated by tomosynthesis.

It would be advantageous to provide a system or method of addressing, overcoming, or reducing the impact of more than a narrow subset of the problems that may arise as a result of using the standard digital radiography image acquisition, processing, and display chain for tomosynthesis. It would also be advantageous to provide a system or method that capitalizes on any one or more of the potential opportunities presented by digital tomosynthesis. Accordingly, it would be advantageous to provide a system or method that has any one or more of these or other advantageous features.

SUMMARY OF THE INVENTION

The present invention relates to a method of creating and displaying images resulting from digital tomosynthesis performed on a subject using a flat panel detector. The method comprises the step of acquiring a series of x-ray images of the subject, where each x-ray image is acquired at different angles relative to the subject. The method also comprises the steps of applying a first set of corrective measures to the series of images, reconstructing the series of images into a series of slices through the subject, and applying a second set of corrective measures to the slices. The method further comprises the step of displaying the images or slices according to at least one of a plurality of display options.

The present invention also relates to a system for creating and displaying images of the internal structures of a subject resulting from digital tomosynthesis performed with a flat panel digital detector. The system comprises a means for acquiring a series of x-ray images of the subject, where each x-ray image is acquired at different angles relative to the subject. The system also comprises a means for applying a first set of corrective measures to the series of images, a means for reconstructing the series of images into a series of slices through the subject, and a means for applying a second set of corrective measures to the slices. The system further comprises a means for displaying the images or slices according to at least one of a plurality of display options.

The present invention further relates to a method of creating and displaying images of the anatomy of a patient using digital tomosynthesis performed with a flat panel detector and other equipment. The method includes the step of receiving inputs relating to options for acquiring x-ray images of the patient, where the options allow for the selection of at least one of a field of view, a method of controlling the dose of the x-rays, the energy level or levels at which the images will be acquired, how a source and a detector will move while the images are acquired, whether a large field of view is desired, the acquisition paths of the source and the detector, and the characteristics of slices to be constructed from the x-ray images. The method also comprises the steps of acquiring a single x-ray image of the patient and adjusting parameters relating to the acquisition of x-ray images. The parameters relating to the acquisition of the x-ray images include at least one of x-ray technique parameters, filtration techniques, position of acquisition, and angle of the acquisition. The method further includes continuing to acquire a single x-ray image and to then adjust the acquisition parameters until a sufficient number of images have been acquired. The method also includes applying detector corrections, intensity corrections, and geometric corrections to one or more of the images and performing at least one of frequency filtering for structure enhancement, tissue equalization, spatial filtering, and image resizing on one or more of the acquired images. The method further includes the steps of constructing at least one slice through the patient by applying a 3D reconstruction algorithm to the data represented by the acquired images, removing artifacts from one or more of the slices, and enhancing information provided in the one or more slices. Additionally, the method includes the step of optimizing the display of one or more of the slices by performing at least one of edge enhancement, tissue equalization, display window level adjustment, and display window width adjustment. The method also includes the step of displaying one or more of the slices as one of a two-dimensional or three-dimensional image or set of images.

The present invention still further relates to a method of adjusting the acquisition parameters for the acquisition of images during tomosynthesis performed on a subject. The method comprises the step of acquiring a first image of the subject, where the first image provides information relating to the subject. The method also comprises the steps of selecting the acquisition parameters for the acquisition of a second image based on the information provided by the first image and acquiring the second image according to the selected acquisition parameters.

Other features and advantages of the invention will become apparent to those skilled in the art upon review of the following detailed description, claims, and drawings.

DETAILED DESCRIPTION OF THE PREFERRED EMBODIMENTS

Figure 1:
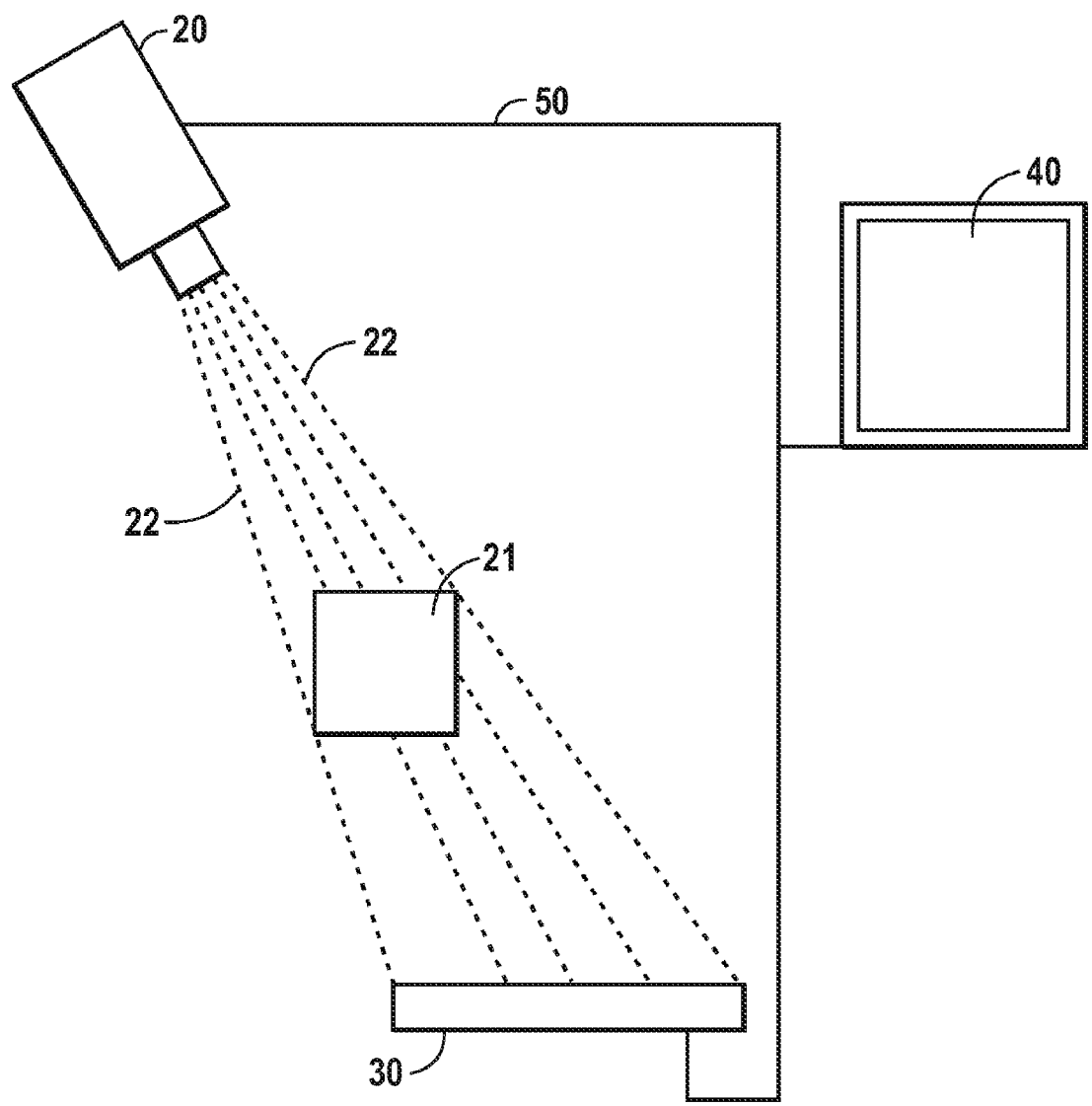
FIG. 1 is a schematic diagram of a tomosynthesis system according to one embodiment of the invention.

Referring to FIG. 1, a tomosynthesis system 10 is shown schematically according to a preferred embodiment. Tomosynthesis system 10 includes an x-ray source 20, a detector 30, a computer 40, and supporting structure 50.

X-ray source 20 is directed toward a subject 21 (e.g., object, patient, etc.) and is configured to emit a beam of x-rays 22 at desired times. Once x-rays 22 are emitted, they pass through subject 21 and are picked up by, or hit, detector 30.

Detector 30 (e.g., x-ray detector, digital radiography detector, flat panel detector, flat detector, etc.) may be any one of a variety of different detectors conventionally known within the art or that will become available in the future (e.g., energy discriminating detectors that are theoretically capable of acquiring high and low energy images simultaneously). However, according to a preferred embodiment, detector 30 is a flat panel digital detector. When x-rays 22 are picked up by detector 30, they are converted into electrical signals that are sent to computer 40. The electrical signals will vary depending on a number of factors, including the angle at which x-rays 22 hit detector 30, the intensity of the different x-rays that hit detector 30, and a number of other factors. Based on these electrical signals, computer 40 is then capable of creating an image of the internal structures of subject 21.

Computer 40 (e.g., processor, controller, etc.) includes processing circuitry that executes stored program logic and may be any one of a variety of different computers, processors, or controllers (or combination thereof) that are available for and compatible with the various types of equipment and devices used in tomosynthesis system 10. Through its various processors and controllers computer 40 controls the operation and function of source 20 and detector 30. For example, computer 40 may control, among other functions and operations, when source 20 emits x-rays, how detector 30 reads and conveys information or signals after the x-rays hit detector 30, and how source 20 and detector 30 move relative to one another and relative to subject 21. Computer 40 also controls how information (e.g. images or data acquired during the tomosynthesis operation) is processed and displayed. The different processing steps performed by computer 40 are dictated and controlled by software designed to allow computer 40 to perform the various operations underlying tomosynthesis. Information may also be stored in computer 40 for later retrieval and use.

During the tomosynthesis operation or process, multiple images of subject 21 are acquired from different perspectives or angles. In order to acquire the images from different perspectives, any one or more of source 20, detector 30, and subject 21 may move relative to one or more of the others while the images are being acquired. This motion may take place at the same time the images are being acquired or in-between the different image acquisitions. The movement of source 20, detector 30, and/or subject 21 (which may be accomplished through a movable table or support structure, which is not shown) are generally controlled by computer 40 based on information entered into computer 40 by someone operating the tomosynthesis equipment, based on pre-defined acquisition protocols, or based on information that has already been acquired by computer 40.

Figure 2:
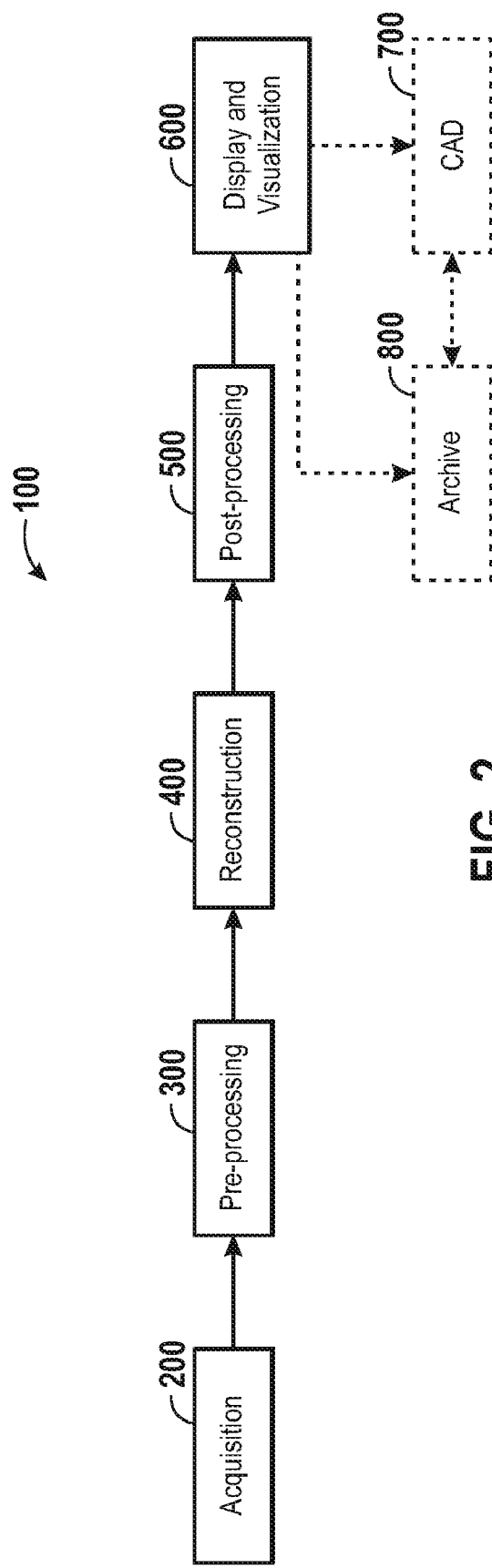
FIG. 2 is a flowchart showing the steps in a tomosynthesis imaging chain according to a preferred embodiment.

Referring to FIG. 2, an imaging chain 100 that is utilized in the tomosynthesis process is shown according to a preferred embodiment. Imaging chain 100 includes steps 200, 300, 400, 500, 600, 700, and 800.

Figure 3:
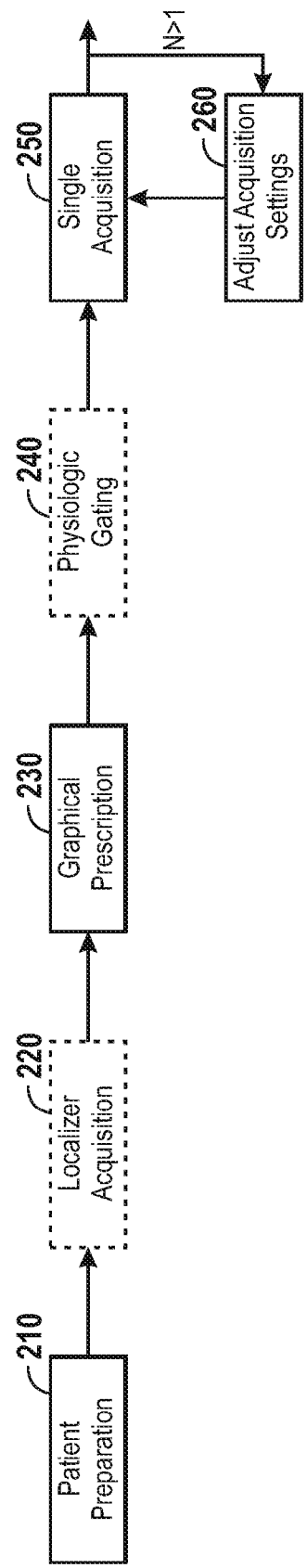
FIG. 3 is a flowchart showing the first step illustrated in the tomosynthesis imaging chain of FIG. 2.

During step 200 (e.g., the acquisition step), the patient is prepared for the tomosynthesis process and the x-ray images are acquired. Referring now to FIG. 3, step 200 can be broken down into sub-steps 210, 220, 230, 240, 250, and 260. At sub-step 210, the patient and x-ray equipment are prepared for the acquisition of x-ray images. This preparation includes generally determining where the x-rays will be focused, placing the patient in the appropriate location, and preparing the x-ray equipment to take images or acquisitions in the desired region of the patient. This may be done through the use of external markers, by placing fiducial markers on the patient, by placing calibration objects in the field of view, through the use of light-field or laser positioning aids (e.g. a cross-hair projected onto the patient that corresponds to the target area), and/or by placing or selecting automatic exposure control sensor(s), etc. According to alternative embodiments, other methods may be used to prepare the patient and x-ray equipment. Moreover, any of the methods may be used individually or in combination with other methods.

At sub-step 220, a "pre-tomosynthesis" image or acquisition (e.g. a localizer acquisition) is acquired in order to get information relating to patient positioning, patient characteristics, and/or acquisition characteristics or parameters. With respect to patient characteristics, the image may provide information such as body thickness and general anatomy and may additionally help with the location and identification of any implantable devices or non-standard structures (e.g. a missing lung, an enlarged heart, etc.). This information, along with other information the pre-tomosynthesis image may provide, may be used by computer 40, or by the operator in a semi-automatic mode, as a basis for optimizing the parameters or characteristics of subsequent acquisitions. For example, the information provided by the pre-tomosynthesis image may be used as a basis for optimizing the energy level of the x-rays used in the subsequent acquisitions, the pulse duration, the tube current, the tube current duration, etc. The pre-tomosynthesis image may be acquired using an equal or lower dose of x-rays than is used to acquire images in later steps in imaging chain 100 (described below). According to one embodiment, the image generated during sub-step 220 may not be utilized during the reconstruction process (described below). According to an alternative embodiment, the pre-tomosynthesis image may be "re-used" in later steps of imaging chain 100 (e.g. one less image may be needed during subsequent steps that would otherwise be required in the absence of the localizer acquisition). According to another alternative embodiment, sub-step 220 may not be part of step 200 and may not be included in imaging chain 100. According to another alternative embodiment, the information provided by any image acquired during the tomosynthesis process may be used as a basis for optimizing the acquisition parameters or characteristics of subsequent acquisitions.

At sub-step 230 (e.g., the graphical prescription step), a variety of parameters relating to the images that will be taken during later steps in imaging chain 100 are selected and set. These parameters relate to the field of view, the method used to control the dose of the x-rays, the energy level of the x-rays, how the x-ray source will be moved during the acquisitions, whether the acquisition will require a field of view larger than the detector area, the acquisition paths of the source and detector, the slice characteristics, and the presence or absence of an anti-scatter grid.

The field of view may be selected by specifying a region of interest within the localizer acquisition taken in sub-step 220. This may be done interactively on computer 40, which displays the localizer acquisition, by indicating where in the resulting image the x-rays should be targeted or focused. The field of view may also be selected by specifying and entering coordinates consisting of reference points defined relative to the patient. In addition, a volume of interest within the patient may be defined by specifying a region of interest in the image as well as a start and end height above the detector (e.g., a thickness of the volume of interest). The number of slices to be reconstructed and the slice separation may also be defined. Slice separation may be predetermined, determined by the acquisition configuration (e.g., the maximum angle), or selected by the operator. In combination with the volume of interest, a variable-opening collimator may be controlled so as to optimally cover the volume of interest, while minimizing the dose of x-rays received by the patient.

There are at least three methods that may be used to control the dose of x-rays received by the patient. The first method is to use ion chambers to automatically control the exposure of the patient to x-rays. The second method is to fix the time/pulse-width of the x-rays used to generate the acquisitions. The third method is to automatically calculate an optimal dose using information from the localizer image or from a previous acquisition in the series of acquisitions acquired during the tomosynthesis process. According to alternative embodiments, other conventional methods of controlling the dose of x-rays received by a patient or subject may be used.

The energy level of the x-rays can be set to a single energy level or to multiple energy levels. For example, at each position and angle of acquisition, a single image can be acquired at a specific energy level, or several images can be acquired at different energy levels. Moreover, the energy level may also vary as a function of the projection angle.

With respect to selecting how the x-ray source will move during acquisitions, the acquisition can be made while the x-ray source is moving (e.g. a continuous acquisition) or after the source settles into each position (e.g. a step & shoot acquisition). The detector may also move, either during the exposure, which may tend to minimize blurring in the continuous scan, and/or between exposures, which tends to optimize the covered volume. To achieve better image quality, or minimize required corrections, the detector may be tilted towards the incident x-ray beam.

If a large field of view (e.g. a field of view that is larger than the detector area) is required, tomosynthesis system 10 may be configured to take multiple tomosynthesis sweeps in succession, and then "paste" or "stitch" the corresponding acquired images together before passing them to the next step in the imaging chain. In an alternative embodiment, the acquired images are used to reconstruct more than one volume of interest, and the pasting or stitching is performed after the 3D reconstruction.

The paths along which the source and detector travel during the process of acquiring images may also be defined. These paths (which may be one-dimensional, two-dimensional, three-dimensional, etc.) are defined by the position or angular orientation (e.g., tilt) of the source and the detector as well as the angle of the source relative to the detector. Moreover, factors such as the type of clinical application, the portion of the anatomy that is of interest, the volume that is of interest, and the size of the patient may be taken into account in selecting the desired path.

Other parameters that may be adjusted relate to the slice characteristics. These parameters relate to the number of slices, the slice thickness (which may be variable or fixed), the slice orientation (e.g. the angle of the slices with respect to detector plane), the start depth, and the end depth. It is also possible to reconstruct on non-planar slices, where the shape or curvature of the slices may be adapted to the anatomy to be imaged.

Still another parameter or option that may be selected is whether to include the anti-scatter grid. If an anti-scatter grid is selected, one of a plurality of available grids may then be selected.

At sub-step 240, the time at which images are acquired is linked to certain physiological signals or events, which is referred to as physiologic gating. Physiologic gating helps to maintain uniformity between the different acquisitions and to increase the quality of the results of the tomosynthesis process. According to one embodiment, a physiological signal such as a patient's heart rhythm (EKG) or breathing cycle is detected and is used as a basis for triggering the acquisition of images. According to this embodiment (referred to as prospective physiologic gating), the timing of the acquisition of images is linked to the physiological events such that acquisitions are taken at certain points or at certain intervals in the physiologic cycle. According to another embodiment, the physiological events are recorded at the time acquisitions are taken. According to this embodiment (referred to as retrospective physiologic gating), the point or interval of the physiological cycle at which the patient is in when the images are acquired is taken into account in the reconstruction and processing of the images in the later steps of imaging chain 100. According to another alternative embodiment, sub-step 240 is not included within imaging chain 100.

At sub-step 250 an acquisition is taken according to the settings selected and applied in the previous steps. Then at sub-step 260, the acquisition parameters are adjusted and another acquisition is taken. Such adjustments to the acquisition parameters may include, but are not limited to, adjustments to the x-ray technique parameters (e.g. the energy level of the x-rays, the pulse duration, the tube current, the tube current duration, etc.), the filtration, the position of acquisition, the angle of acquisition, etc. These adjustments are made to provide the variety of different images (e.g., datasets) that will later be reconstructed into the desired view. In making these adjustments, the x-ray technique parameters may be the same (e.g. constant, fixed, pre-determined) for all images or the parameters may be varied between images. If adjustments are made to the x-ray technique parameters between any of the images, the adjustments may be based on information acquired from the pre-tomosynthesis image, on information acquired from any previous image or images, or on other relevant information. Sub-step 260 is repeated until a sufficient number of images (e.g., datasets) have been obtained to allow computer 40 to reconstruct the desired volume of interest. The acquisition of a sufficient number of images from different perspectives or acquisition angles allows computer 40 to construct a three-dimensional dataset by suitably combining the individual datasets that are represented by particular images. According to alternative embodiments, the acquisitions may be taken while the detector is moving or while the detector is stationary.

Figure 4:
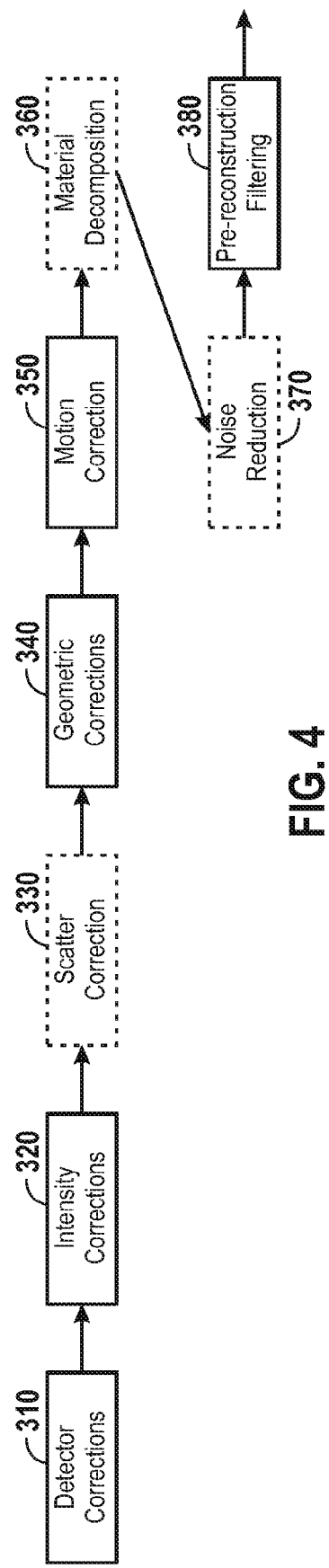
FIG. 4 is a flowchart showing the second step illustrated in the tomosynthesis imaging chain imaging chain of FIG. 2.

As illustrated in FIG. 2, the acquisitions taken in step 200 are processed at step 300. Step 300 (e.g. "pre-processing") involves the processing of the images or acquisitions taken in step 200 to correct or modify various attributes or characteristics of the images. Like step 200, step 300 can be broken down into a number of different sub-steps, which are illustrated in FIG. 4.

At sub-step 310, various corrections (e.g., detector corrections, etc.) are made to correct properties of the images that arise as a result of the use of a detector, and in particular, a flat panel digital detector. These corrections include bad pixel/line correction, gain map correction, corrections specific to dual energy acquisitions (if used) such as laggy pixel corrections, etc.

At sub-step 320, intensity corrections are made. Intensity corrections include corrections of variations due to the imaging geometry, such as ($1/r^2$) attenuation, heel effect, and tube angulation. Intensity corrections may also include corrections to the sensitivity map of the detector, corrections to offset the effects of Modulation Transfer Function (MTF) variations, etc. Finally, intensity corrections may also include corrections of intensity variation due to use of different x-ray energies at different positions/angles.

At sub-step 330, scatter corrections, which are particularly important when no scatter grid is used during the acquisition of the images, are made to reduce the effects of scatter. Scatter corrections can be made using scatter reduction algorithms that use information from multiple energy images to perform the correction. Scatter correction can depend on the angle of acquisition or be angle-independent.

Sub-steps 310, 320, and 330 can be used in combination to achieve quantitative images in situations such as where the values at each pixel correspond to the line integral of the attenuation coefficient along the corresponding ray. Reference calibration measurements also may be used to achieve quantitative images.

At sub-step 340, geometric corrections are made to reduce the effects of any non-uniformities in the equipment setup or operation. Such non-uniformities may include, for example, deflection or sag in supporting structure 50 of tomosynthesis system 10, which may cause the source and the detector to be slightly out of position with respect to one another. Non-uniformities may also include, among other things, jitter in the track (e.g, railing, channel, guide, etc.—not shown) along which source 20 and detector 30 move. Geometric corrections may be based on calibration events or runs that are performed once after the installation of tomosynthesis system 10 or they may be based on calibration events or runs that are repeated on a periodic basis. According to alternative embodiments, the geometric corrections may be based on image information using, for example, fiducial or anatomical markers. According to other alternative embodiments, geometric corrections may be relative (i.e., the geometry used may not be the "true" geometry) or absolute without compromising the reconstructed image quality.

At sub-step 350, motion corrections are made to account for any motion of the patient that may have occurred between acquisitions (e.g., contractions of the heart, expansion or contraction of the lungs, external movement, etc.). Motion corrections are made by aligning (e.g., registering) the images based on the anticipated position of external fiducial markers or anatomic landmarks, including aligning or registering the multiple energy images acquired at a single position and angle.

At sub-step 360, material decomposition is performed. Material decomposition is applicable when multiple energy acquisitions are used and serves to create separate images of different tissue types (e.g., creates a separate image of bone and a separate image of soft-tissue). Techniques such as log-subtraction or basis material decomposition may be used to perform the material decomposition.

At sub-step 370, any "noise" present in the images is removed or reduced. The noise reduction process is based on noise reduction algorithms. These algorithms may be applied to images independently, or the algorithms may share information across images.

At sub-step 380, various filtering techniques (e.g. pre-reconstruction filtering) may be applied to the acquisitions. Such filtering techniques may include frequency filtering for specific tissue and/or structure enhancement, tissue equalization, spatial filtering, image resizing/shrinking, etc. These operations or techniques can be tailored to the specific reconstruction technique or techniques used, to the acquisition parameters, and to various attributes of the patient.

According to alternative embodiments, each of sub-steps 330, 350, 360, and 370 are optional steps that may not be included within imaging chain 100.

Figure 5:
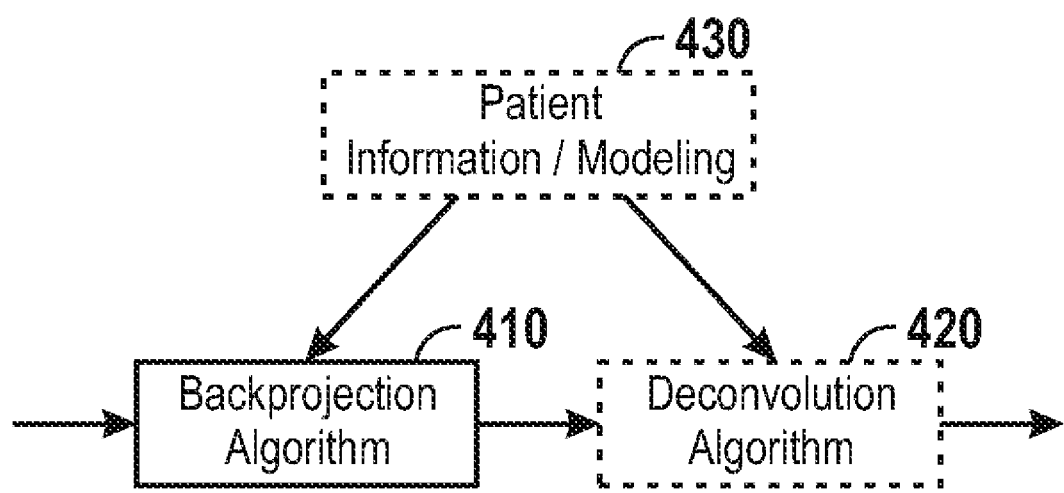
FIG. 5 is a flowchart showing the third step illustrated in the tomosynthesis imaging chain imaging chain of FIG. 2.

As illustrated in FIG. 2, the acquisitions processed at a step 300 are reconstructed at step 400. Step 400 (e.g. "reconstruction") involves using the data and information from the acquired images to construct an image (e.g. a "slice," reconstructed image, etc.) of the patient. Referring now to FIG. 5, step 400 may include sub-steps 410, 420, and 430.

At sub-step 410, the acquisitions obtained in the previous steps are reconstructed (e.g. constructed, transformed, rendered, etc.) into one or more slices through the patient (or other object) using a 3D reconstruction algorithm. The reconstruction algorithm may employ a cone-beam geometry (which may allow for precise measurements of the size of objects, but which may be computationally somewhat slow), or a parallel beam geometry (which is computationally fast, but which may result in variances of the physical distances between pixels as a function of the height of the reconstructed slice or image). The techniques through which the acquisitions are reconstructed include shift and add, filtered back projection (FBP), generalized filtered back projection (GFBP), Fourier reconstruction, objective function-based reconstruction, variations of the algebraic reconstruction technique (ART), matrix inversion tomo-synthesis (MITS), order statistics-based backprojection (OSBP), or any combination or these or other reconstruction techniques. The reconstruction also may make use of prior information, which may include, but is not limited to, a geometric model of the relevant anatomy or physical constraints of a patient. Such prior information may also include information pertaining to the point in the physiological cycle at which the patient or subject was in when a particular image was acquired. Such prior information may further include information pertaining to the chemical composition and associated attenuation spectra of tissues in the body. Such prior information may additionally include previously acquired medical scans of the patient, such as x-ray tomosynthesis, CT, MR, and/or ultrasound imagery. Moreover, the reconstruction may involve using additional images (e.g., using an additional lateral (LAT) view in addition to the posterio-anterior (PA) tomosynthesis sequence, or using a PA and a LAT tomosynthesis sequence).

At sub-step 420, a deconvolution algorithm is used to help remove any blur that may arise from sub-step 410. According to an alternative embodiment, sub-step 420 may be excluded from step 400 and from imaging chain 100.

At sub-step 430, patient information is input into the 3D reconstruction process (sub-step 410) and/or the deconvolution process (sub-step 420) to improve or optimize the overall reconstruction process. The patient information may include information relating to current or historical physical and pathological conditions (e.g., size, composition, abnormal anatomy, etc.) and/or to the acquisition parameters of previous acquisitions (e.g., the energy level of the x-rays, the pulse duration, the tube current, the tube current duration, the filtration, the position of acquisition, the angle of acquisition, etc.). To use such information in the reconstruction process, patient qualitative and/or quantitative model(s) are formed. The use of the patient information in this manner may help to optimize reconstruction with respect to the parameters of acquisition and/or the patient or imaged anatomy. According to an alternative embodiment, sub-step 430 is an optional step that may be excluded from step 400 and from imaging chain 100.

Figure 6:
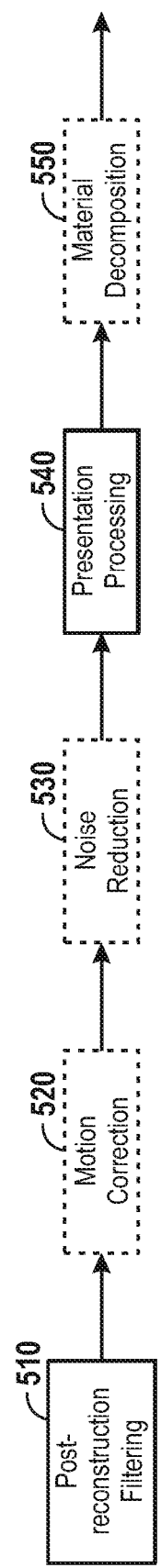
FIG. 6 is a flowchart showing the fourth step illustrated in the tomosynthesis imaging chain imaging chain of FIG. 2.

Referring now to FIGS. 2 and 6, the images (e.g. slices) reconstructed in step 400 are then subjected to further processing at step 500. Step 500 (e.g. "post-processing") involves the processing of the images reconstructed in step 400 to correct, remove, adjust, enhance, etc. various attributes or characteristics of the images. The post-processing of step 500 can be broken down into sub-steps, which are illustrated in FIG. 6.

At sub-step 510, the reconstructed images are filtered to remove potential artifacts or attributes, such as streaking, that may arise as a result of the reconstruction step 400. The information conveyed by the images may also be enhanced. According to alternative embodiments, this enhancement of the image information may include, among other things, the removal of ribs and direction filtering.

At sub-step 520, any residual motion artifacts contained within the images created during step 400 are removed or reduced. Such artifacts may include soft-tissue detail blurring, bone edge blurring, heart contour shadowing, overshoot/undershoot at the edges of an organ, etc.

At sub-step 530, noise reduction algorithms similar to those utilized in sub-step 370 are applied to the reconstructed images to reduce or eliminate the effects of "noise" within the images. The noise reduction algorithms may be applied to the images independently, or the algorithms may share information across images.

At sub-step 540, various attributes of the reconstructed images that relate to the presentation of those images are processed. This processing may include edge enhancement, tissue equalization, and the adjustment of the display window level and window width for optimal display. Look-up tables for clinical displays that are specific to certain applications also may be applied. Appropriate dynamic range management (DRM) algorithms also may be applied.

At sub-step 550, material decomposition techniques, including log-subtraction and basis material decomposition, are applied to the images when three-dimensional data sets from multiple energy acquisitions have been reconstructed separately.

According to alternative embodiments, each of sub-steps 510, 520, 530, 540 and 550 are optional steps that may not be included within imaging chain 100.

Figure 7:
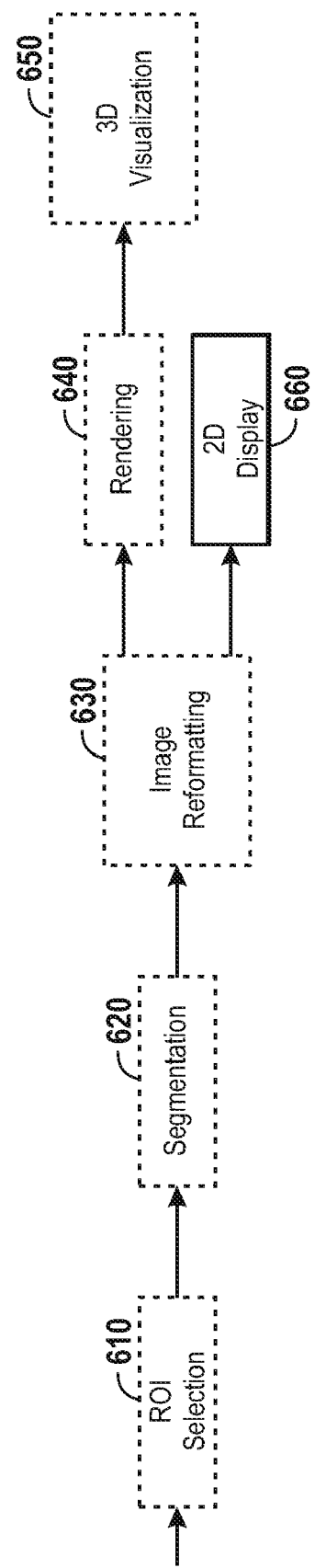
FIG. 7 is a flowchart showing the fifth step illustrated in the tomosynthesis imaging chain imaging chain of FIG. 2.

Referring now to FIGS. 2 and 7, step 600 consists of presenting and/or analyzing the information processed in step 500. Like the previous steps, sub-step 600 can be broken down into several sub-steps.

At sub-step 610, the region-of-interest (e.g., the particular part of the subject or patient one wishes to examine) is selected for display and visualization. According to alternative embodiments, the selection of the region-of-interest may be interactive (e.g., selected manually) or the selection may be automatic or semi-automatic. An automatic or semi-automatic selection may be based on the automatic localization of anotomical features or other distinct features of the subject or patient.

At sub-step 620, a specific structure or tissue is segmented for display and visualization. Such segmentation may be done for each slice individually or it may be based on information acquired across the different slices.

At sub-step 630, the image (or the data on which the image is based) is reformatted and/or re-mapped. The reformatting and/or re-mapping of sub-step 630 may include Multi-Planar Reformatting (MPR) for "slicing" data sets at different angles, Maximum Intensity Projection (MIP), or various other reformatting or re-mapping techniques.

At sub-step 640, the image may be rendered. The rendering may be surface or volume rendering and may include the adjustment of transparency levels.

At sub-step 650, the rendered data set is displayed. According to alternative embodiments, the viewing perspective and other parameters may be controlled interactively or they may run in a loop using predetermined settings. In one embodiment, some of the display parameters may depend on specific parameters of the acquisition. For example, the maximum viewing angle may be limited as a function of the tube angles utilized during the acquisition.

As an alternative to sub-steps 640 and 650, the data may be viewed as a two-dimensional set of images in sub-step 660. This may be done by looking at the images side-by-side, by looking at the images in a cine loop according to a temporal display, by interactively toggling between the different slices, or by using any one of a plurality of other different two-dimensional viewing techniques. In one embodiment, the two-dimensional images can be generated from the reconstructed slices (e.g., by taking the average of appropriate subsets of slices).

According to alternative embodiments, any one or more of sub-steps 610, 620, 630, 640, and 650 is optional and may be excluded from imaging chain 100.

Referring now to FIG. 2, imaging chain 100 also includes step 700. Step 700 includes using computer 40 to aid or assist in the processing and/or diagnosis of various attributes or characteristics embodied within the acquisitions and corresponding data, which is known as computer-aided detection (CAD). Step 700 is performed using processing and diagnosis algorithms, which can be general radiography algorithms or which can be tailored to tomosynthesis slices and/or three-dimensional datasets. The CAD algorithm may act on the projection images (e.g. the images upon which the reconstructed slices are based), the reconstructed slices, the full three-dimensional dataset, or any combination of these. CAD may include a consistency check, for example in the case of CAD acting on the projection images, where the suspicious regions that are detected are linked via the reconstructed three-dimensional geometry. Moreover, CAD results may be used as a basis for the automatic choice of the region-ofinterest for display. Furthermore, using the results of segmentation and/or quantitative images, CAD can provide quantitative results, such as the size and/or thickness of lesions. CAD can also include temporal analysis of datasets, for example temporal subtraction images, combined with registration techniques. According to an alternative embodiment, step 700 is an optional step that may be excluded from imaging chain 100.

Referring still to FIG. 2, step 800 includes storing the images and data for future retrieval, analysis, comparison, etc. Once the images and data have been stored, they can be used as input into a CAD system or can be directly viewed at a later time.

According to a preferred embodiment, the various steps and sub-steps described above are performed in the order in which they are described and depicted in FIGS. 1-7. However, according to alternative embodiments, the steps and sub-steps may be performed in any order or sequence.

While the embodiments and application of the invention illustrated in the figures and described above are preferred, it should be understood that these embodiments are offered by way of example only. Accordingly, the present invention is not limited to a particular embodiment, but extends to various modifications that nevertheless fall within the scope of the appended claims.

What is claimed is:

1. A method of creating and displaying images resulting from digital tomosynthesis performed on a subject using a flat panel detector comprising the steps of:
   acquiring a series of x-ray images of the subject, the x-ray images being acquired at two or more different angles relative to the subject, wherein the step of acquiring a series of x-ray images comprises:
      receiving inputs relating to options for acquiring x-ray images of the subject, the options allowing for the selection of at least one of a field of view, a method of controlling the dose of the x-rays, an energy level or levels at which the images will be acquired, how a source and a detector will move while the images are acquired, whether a large field of view is desired, acquisition paths of the source and the detector, or characteristics of the slice to be constructed from the x-ray images;
      acquiring a single x-ray image of the subject; and
      adjusting parameters related to the acquisition of x-ray images, the parameters including at least one of x-ray technique parameters, filtration techniques, position of acquisition, or angle of the acquisition;
   applying a first set of corrective measures to the series of images;
   reconstructing the series of images into at least one slice through the subject;
   applying a second set of corrective measures to the at least one slice; and
   displaying the at least one slice according to at least one of a plurality of display options.

2. The method of claim 1, wherein the first set of corrective measures includes at least one of detector correction, intensity correction, scatter correction, geometric correction, motion correction, material decomposition, noise reduction, or filtration.

3. The method of claim 1, wherein the second set of corrective measures includes at least one of filtering, motion correction, noise reduction, presentation processing, or material decomposition.

4. The method of claim 1, wherein the display options allow for at least one of a selection of the region of interest, segmentation, formatting of the images, rendering and creation of a three-dimensional display, or creation of a two-dimensional display.

5. The method of claim 4, wherein the step of displaying the at least one slice according to at least one of a plurality of display options comprises the step of displaying the at least one slice in a two-dimensional display.

6. The method of claim 4, wherein the step of displaying the at least one slice according to at least one of a plurality of display options comprises the step of displaying the at least one slice in a three-dimensional display.

7. The method of claim 1, further comprising the step of applying computer assisted processing and diagnosis algorithms to data represented by the images or the at least one slice.

8. The method of claim 1, further comprising the step of archiving data represented by the images or the at least one slice.

9. The method of claim 1, wherein the step of acquiring a series of x-ray images of the subject is performed before the step of reconstructing the series of images into at least one slice through the subject.

10. The method of claim 1, wherein the step of acquiring a series of x-ray images further comprises the step of:
    continuing to acquire a single x-ray image and to then adjust the acquisition parameters until a sufficient number of images have been acquired.

11. The method of claim 1, wherein at least one of the parameters related to the acquisition of the x-ray images is adjusted based on information provided by a previously acquired image.

12. The method of claim 1, wherein the step of acquiring a series of x-ray images further comprises the steps of:
    acquiring an initial x-ray image of the subject; and
    detecting at least one physiological signal from the subject and using the physiological signal as a basis for one of triggering the acquisition of subsequent x-ray images and processing the x-ray images after they have been acquired.

13. The method of claim 1, wherein the step of reconstructing the series of images into at least one slice though the subject further comprises the step of applying a reconstruction algorithm to the data represented by the series of x-ray images, the reconstruction of the at least one slice being optionally based on historical information relating to at least one of the physical condition of the subject, the pathological condition of the subject, or the acquisition parameters of at least one previous acquisition.

14. The method of claim 13, wherein the step of reconstructing the series of images into at least one slice though the subject further comprises the step of applying a deconvolution algorithm to the at least one slice, the application of the deconvolution algorithm being optionally based on historical information relating to at least one of the physical condition of the subject, the pathological condition of the subject, or the acquisition parameters of at least one previous acquisition.

15. A system for creating and displaying images of the internal structures of a subject resulting from digital tomosynthesis performed with a flat panel digital detector comprising:
    a means for acquiring a series of x-ray images of the subject, the x-ray images being acquired at two or more different angles relative to the subject, wherein the means for acquiring a series of x-ray images comprises:
       a means for receiving inputs relating to options for acquiring x-ray images of the subject, the options allowing for the selection of at least one of a field of view, a method of controlling the dose of the x-rays, an energy level or levels at which the images will be acquired, how a source and a detector will move while the images are acquired, whether a large field of view is desired, acquisition paths of the source and the detector, or characteristics of the slice to be constructed from the x-ray images;

a means for acquiring a single x-ray image of the subject; and a means for adjusting parameters related to the acquisition of x-ray images, the parameters including at least one of x-ray technique parameters, filtration techniques, position of acquisition, or angle of the acquisition;

a means for applying a first set of corrective measures to the series of images;

a means for reconstructing the series of images into at least one slice through the subject;

a means for applying a second set of corrective measures to the at least one slice; and a means for displaying the at least one slice according to at least one of a plurality of display options.

16. The system of claim 15, wherein the first set of corrective measures includes at least one of detector correction, intensity correction, scatter correction, geometric correction, motion correction, material decomposition, noise reduction, or filtration.

17. The system of claim 15, wherein the second set of corrective measures includes at least one of filtering, motion correction, noise reduction, presentation processing, or material decomposition.

18. The system of claim 15, wherein the display options allow for at least one of a selection of the region of interest, segmentation, formatting of the images, rendering and creation of a three-dimensional display, or creation of a two-dimensional display.

19. The system of claim 15, further comprising the step of applying computer assisted processing and diagnosis algorithms to data represented by the images or the at least one slice.

20. The system of claim 15, further comprising the step of archiving data represented by the images or the at least one slice.

21. A method of creating and displaying images resulting from digital tomosynthesis performed on a subject using a flat panel detector comprising the steps of:

acquiring a series of x-ray images of the subject, the x-ray images being acquired at two or more different angles relative to the subject, wherein the step of acquiring a series of x-ray images comprises the step of adjusting parameters related to the acquisition of x-ray images between the acquisitions of the x-ray images, the parameters including at least one of x-ray technique parameters, filtration techniques, position of acquisition, or angle of the acquisition;

applying a first set of corrective measures to the series of images, wherein the first set of corrective measures includes at least one of detector correction, intensity correction, scatter correction, geometric correction, motion correction, material decomposition, noise reduction, or filtration;

reconstructing the series of images into at least one slice through the subject, wherein the step of reconstructing the series of images into at least one slice through the subject further comprises the step of applying a reconstruction algorithm to the data represented by the series of x-ray images;

applying a second set of corrective measures to the at least one slice; and displaying the images or slice according to at least one of a plurality of display options that allow for at least one of a selection of the region of interest, segmentation, formatting of the images, rendering and creation of a three-dimensional display, or creation of a two-dimensional display.

22. The method of claim 21, wherein at least one of the parameters related to the acquisition of the x-ray images is adjusted based on information provided by a previously acquired image.

* * * * *